(12) United States Patent
Koehrsen et al.

(10) Patent No.: US 7,747,369 B2
(45) Date of Patent: Jun. 29, 2010

(54) SYSTEM AND METHOD FOR SHARING TERRAIN DATA AMONG MULTIPLE MACHINES

(75) Inventors: Craig Lawrence Koehrsen, East Peoria, IL (US); William Charles Sahm, Dunlap, IL (US)

(73) Assignee: Caterpillar Trimble Control Technologies, LLC, Dayton, OH (US)

( * ) Notice: Subject to any disclaimer, the term of this patent is extended or adjusted under 35 U.S.C. 154(b) by 667 days.

(21) Appl. No.: 11/300,444

(22) Filed: Dec. 15, 2005

(65) Prior Publication Data

US 2007/0142989 A1 Jun. 21, 2007

(51) Int. Cl.
G06F 19/00 (2006.01)
(52) U.S. Cl. ....................................................... 701/50
(58) Field of Classification Search ................... 701/50, 701/23, 213–215
See application file for complete search history.

(56) References Cited

U.S. PATENT DOCUMENTS

| | | | |
|---|---|---|---|
| 5,646,844 A | 7/1997 | Gudat et al. | |
| 5,935,192 A | 8/1999 | Henderson et al. | |
| 6,037,901 A | 3/2000 | Devier et al. | |
| 6,226,572 B1 * | 5/2001 | Tojima et al. | 701/23 |
| 7,283,810 B1 * | 10/2007 | Arakawa et al. | 455/414.1 |

FOREIGN PATENT DOCUMENTS

CA 2506 374 11/2005

EP 1 385 102 A2 1/2004

OTHER PUBLICATIONS

Notice of Office Action and Office Action from the People's Republic of China dated Jul. 25, 2008 for Application No. 200610168901.7.
Notice of Office Action and Office Action from Swedish Patent Office dated Sep. 28, 2007 for Swedish Patent Application No. 0602720-5.
Notice of Office Action and Office Action from Chinese Patent Office dated Apr. 10, 2009 for Chinese Patent Application No. 200610168901.7.
Notice of Office Action and Office Action from Swedish Patent Office dated Apr. 8, 2009 for Swedish Patent Application No. 0602720-5.

* cited by examiner

*Primary Examiner*—Yonel Beaulieu
(74) *Attorney, Agent, or Firm*—Finnegan, Henderson, Farabow, Garrett & Dunner, LLP (57) ABSTRACT

Systems and methods for sharing terrain data among one or more machines include a communications system associated with the one or more machines in electronic communication with each other and to a communications system associated with a remote location. The terrain data may be determined from information received from satellite positioning systems. New information comprising alterations to a worksite by one or more machines may be stored as a snippet. Collected snippets may be combined to form a data block which is sent to one or more identified machines. A bitmap, corresponding to each snippet, is sent to the one or more identified machines in order to locate the new information in the data block. Using the new information, the one or more identified machines may update a composite model of the worksite located at each of the one or more identified machines.

36 Claims, 8 Drawing Sheets

FIG. 1

| 200 | $202_{1,1}$ | $202_{1,2}$ | $\cdots$ | $202_{1,N}$ |
|---|---|---|---|---|
| | $202_{2,1}$ | $202_{2,2}$ | $\cdots$ | $202_{2,N}$ |
| | $\vdots$ | $\vdots$ | $\cdots$ | $\vdots$ |
| | $202_{M,1}$ | $202_{M,2}$ | $\cdots$ | $202_{M,N}$ |

FIG. 2A

| $300_1$ | $302_{1,1}$ | $302_{1,2}$ | $\cdots$ | $302_{1,R}$ |
|---|---|---|---|---|
| | $302_{2,1}$ | $302_{2,2}$ | $\cdots$ | $302_{2,R}$ |
| | $\vdots$ | $\vdots$ | $\cdots$ | $\vdots$ |
| | $302_{Q,1}$ | $302_{Q,2}$ | $\cdots$ | $302_{Q,R}$ |

| | $404_1$ | $404_2$ | $\cdots$ | $404_R$ |
|---|---|---|---|---|
| $406_1$ | $402_{1,1}$ | $402_{1,2}$ | $\cdots$ | $402_{1,R}$ |
| $406_2$ | $402_{2,1}$ | $402_{2,2}$ | | $402_{2,R}$ |
| $\vdots$ | $\vdots$ | $\vdots$ | | $\vdots$ |
| $406_Q$ | $402_{Q,1}$ | $402_{Q,2}$ | $\cdots$ | $402_{Q,R}$ |

SYSTEM AND METHOD FOR SHARING TERRAIN DATA AMONG MULTIPLE MACHINES

TECHNICAL FIELD

This disclosure relates generally to communications systems used by mobile machines and, more specifically, to systems and methods for providing a wireless communications system that allows near real-time updates of terrain data for geography-altering machines.

BACKGROUND

Geography-altering machines such as bulldozers, wheel loaders, and other earth moving equipment, may alter a landscape of a worksite in accordance with a predetermined plan. The predetermined plan may specify certain dimensions of the worksite and the geography-altering machines may alter the landscape in accordance with the predetermined plan.

Each machine may have an on-board communications system, an on-board computer, and a memory including a database. The on-board communications system may send and/or receive data associated with the work being performed by the machine. The on-board computer may display information regarding the landscape of the worksite and work being performed by the particular machine. The memory, including the database, may be electronically coupled to the on-board computer. The on-board communications system may electronically communicate with a communication system at a remote location so that when the worksite is geographically altered by the machine, a composite model of the worksite located at the remote location may be updated.

The composite model typically represents a topography of the worksite as one or more machines alter the landscape of the worksite. Typically, in order for each machine to store and update the composite model, large amounts of data must be exchanged between the machines and the office. In addition, the data should be transmitted often so that the composite model at each machine is kept current. Thus, due to the large amount of data required for the composite model and the frequency such data is to be transmitted, the composite model is not available to the multiple machines in a near real-time manner. Therefore, when multiple machines are operating to alter the landscape of a section of land, for example, operators of the machines may not have an accurate depiction of their collective work. Rather, a viewable composite model available to each machine operator typically only reflects changes to the landscape made by that machine.

U.S. Pat. No. 5,646,844 to Gudat et al. discloses a system in which information regarding the composite model is made available to all machines operating on the worksite in a real-time basis. The machines may share a common, dynamically-updated database that stores updated terrain data or, alternatively, each machine may contain its own dynamically-updated database. Terrain data (or information) may include types of data associated with a worksite to determine a status of a project at the worksite. For example, terrain data may include elevation data, coverage data, compaction data, or material type. A terrain cell, associated with the terrain data, may also include an indication of time. The indication of time is used to determine if a received terrain cell is newer than current terrain data in the database. The database is updated only if the incoming data is newer.

Gudat et al. discloses calculating a position of the machines and alterations to the worksite by each machine based on raw Global Positioning System (GPS) positions received by a GPS sensor located on each machine. Raw GPS positions are coordinates transmitted from multiple GPS satellites, typically four (4) GPS satellites, that represent x, y, z positions and time (t). The raw GPS positions may be used by each machine's computer processor to determine specific terrain data associated with that machine and thus the work performed by that machine on the worksite. In order to calculate the terrain data, the machine takes into account particular characteristics of the machine, such as the type of machine (bulldozer, compactor, excavator, etc.), width and length of the implement (e.g. a blade), the distance of the GPS sensor to the implement or ground, and possibly other parameters inherent to the type of machine.

In the system of Gudat et al., raw GPS positions of one machine (e.g., a sending machine) are shared with other machines (e.g., receiving machines) on the worksite. The receiving machines use the received raw GPS positions of the sending machine to calculate specific terrain data associated with the sending machine and update a composite model with each of the receiving machines based on specific terrain data of the sending machine. In order to accomplish such updating, however, the receiving machines are required to store information concerning the particular characteristics of the sending machine (e.g., type of machine, width and of the blade, the distance of the GPS sensor of the sending machine to the ground, etc.). Thus, the receiving machines re-calculate the terrain data upon the initial receipt of the raw GPS positions. The process is repeated for all the machines at the worksite by continuously sending raw GPS positions of each machine to the other machines of the worksite. Such re-calculations are inefficient. Moreover, because each of the machines on a particular worksite are required to store the particular characteristics of all the other machines in order to compute the specific terrain data attributed to those machines, considerable processing time and effort is required to update the composite model at each machine. Further, the transmission of raw GPS positions may become voluminous because the raw GPS positions are sent regardless of whether any work on the worksite has been conducted by a particular machine. Accordingly, information may be transmitted unnecessarily between machines (i.e., raw GPS positions may be transmitted between machines even though no updating of the composite model is required).

Also, delays in processing the GPS data may introduce errors. For example, if processing occurs every five seconds, there may be deviations between the terrain data derived from raw GPS positions from a machine and the actual terrain data of the worksite.

The disclosed system is directed at overcoming one or more of the shortcomings in the existing technology.

SUMMARY OF THE INVENTION

In accordance with on aspect of the disclosure, there is provided a method for sharing terrain data on a worksite. The method includes generating a plurality of packets of terrain data associated with alterations performed on the worksite and transmitting the plurality of packets of terrain data from a first machine to a second machine.

According to another aspect of the present disclosure, a system is provided for sharing terrain data on a worksite. The system includes a communications system associated with a first machine. The communications system is configured to send a plurality of first packets of terrain data corresponding to alterations on the worksite associated with the first machine. The communications system is also configured to receive a plurality of second packets of terrain data corresponding to alterations on the worksite associated with a second machine. The system further includes a database, associated with the first machine. The database is configured to store the plurality of first packets of terrain data and the plurality of second packets of terrain data.

DETAILED DESCRIPTION

Figure 1:
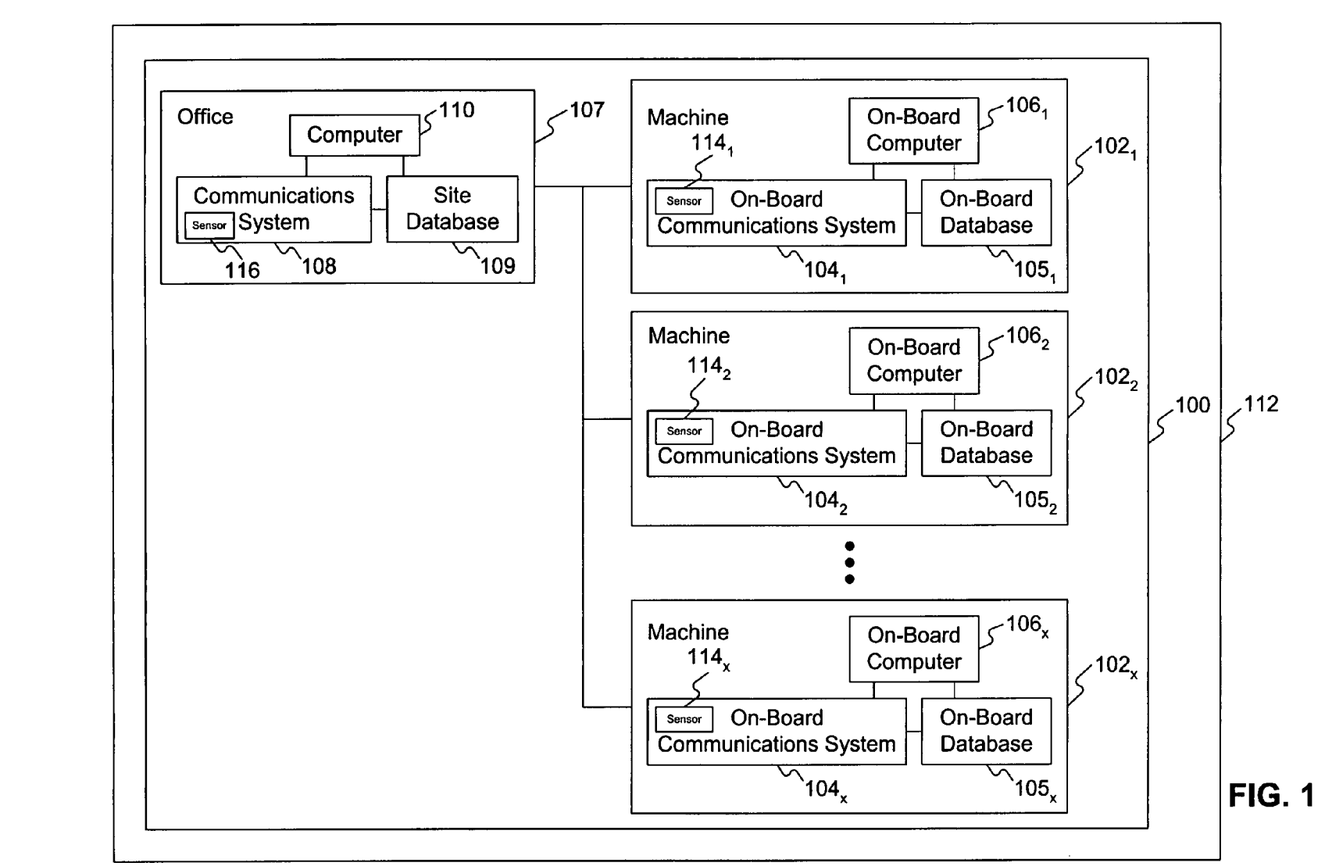
FIG. 1 is a block diagram of a system for sharing terrain data consistent with one exemplary embodiment of the present disclosure.

FIG. 1 illustrates a system 100 consistent with an aspect of the present disclosure. System 100 includes machines $102_1$-$102_x$, and a remote location or office 107. Each of machines $102_1$-$102_x$ may further include a respective one of on-board communications systems $104_1$-$104_x$, on-board databases $105_1$-$105_x$, and on-board computers $106_1$, -$106_x$. On-board communications systems $104_1$-$104_x$ may respectively include sensors $114_1$-$114_x$. Office 107 may further include communications system 108, site database 109, and computer 110. Communications system 108 may include sensor 116. System 100 may operate on a worksite 112.

Machines $102_1$-$102_x$ may be compactors, dozers, excavators, or other machinery designed to geographically alter a landscape of a worksite. Office 107 may be a central hub or other reference base that coordinates efforts of machines 102. Communications systems $104_1$-$104_x$ electronically communicate with a communications system 108 of office 107, preferably over one or more wireless links.

Communications systems $104_1$-$104_x$ and 108 include known components (e.g., sensors $114_1$-$114_x$ and sensor 116) for receiving and sending data related to GPS positioning information or other information indicative of the terrain of worksite 112.

Computers $106_1$-$106_x$ and 110 may be any type typically found in the art and may include a central processing unit (CPU), random access memory (RAM), read-only memory (ROM), as well as input and output devices (e.g., a keyboard, mouse, external disk drives, printer, or other known input and output devices, and display means such as a monitor).

Databases $105_1$-$105_x$ and 109 include conventional databases in which information is stored in accordance with a specific format and is accessible by a computer (e.g., computers $106_1$-$106_x$ and 110).

As machine $102_1$, for example, performs work on a particular area of worksite 112, position data from satellite positioning systems (e.g., global positioning systems (GPS)) is received by machine $102_1$. Specifically, machine $102_1$ may receive position information from a GPS satellite through a known GPS receiver, and based on such position information, calculate its position on worksite 112, as well as calculate other information related to worksite-related parameters for machine $102_1$. The worksite related parameters may include elevation, compaction, ore status, and coverage. In addition, each cell, corresponding to the calculated information, may also contain an indication of time. Time is used to determine if the incoming information is newer than archived information residing in the database. If it is, the database is updated with the newest information.

Elevation information may include the height or depth of a material on the worksite in units of, for example, centimeters, and compaction information may include the compaction level which is found by counting the number of passes after detecting an increase in elevation.

Ore status is an indicator of a current mining status for a particular area. Ore status indicates whether the current area is being mined, has been completely mined out, or has not been mined at all. Ore status may be used to determine how much progress has been made in mining an Ore Design. Ore status information may be related to a quality of ore being processed by one or more of machines $102_1$-$102_x$. For example, different types of ore may be placed by a loader to be transported away from the worksite. Machine $102_1$ may be dedicated to processing one type of ore and machine $102_2$ may be dedicated to processing another type of ore, and the two types of ore may be blended at a crusher. In order for the office of a worksite to know which type of ore each machine processes, one of machines $102_1$-$102_x$ may transmit ore information to another one of machines $102_1$-$102_x$. As a result, ore status information indicating a level of quality of ore being processed can be obtained.

Coverage information may be related to the number of passes a machine has made over an area, or other information like radio latency, number of satellites detected in a particular area, GPS position accuracy, or activity done in an area as selected by the operator.

Productivity information generally relates to a measurement of an amount of work, for example, performed by each machine $102_1$-$102_x$. The amount of work is determined by accurately calculating the volume and area of material or land moved by a particular one of machines $102_1$-$102_x$. Since terrain data can be attributable to a particular machine, e.g., $102_1$, at a near real-time speed, accurate determinations of volume and area of material moved by a particular one of machines $102_1$-$102_x$ may be determined. Thus, machine $102_1$, for example, may not take credit for work done by machine $102_2$.

In addition to the terrain data generated at each machine $102_1$ to $102_x$, each machine (e.g., machine $102_1$) can also receive terrain data generated by other machines at the worksite, such as, machine $102_2$. As discussed in greater detail below, each machine stores terrain data associated with its own work, as well as received terrain data associated with the work of other machines, to generate a composite model 200 that represents the topography of worksite 112. Composite model 200 will next be described in greater detail with reference to FIG. 2A.

Figure 2A:
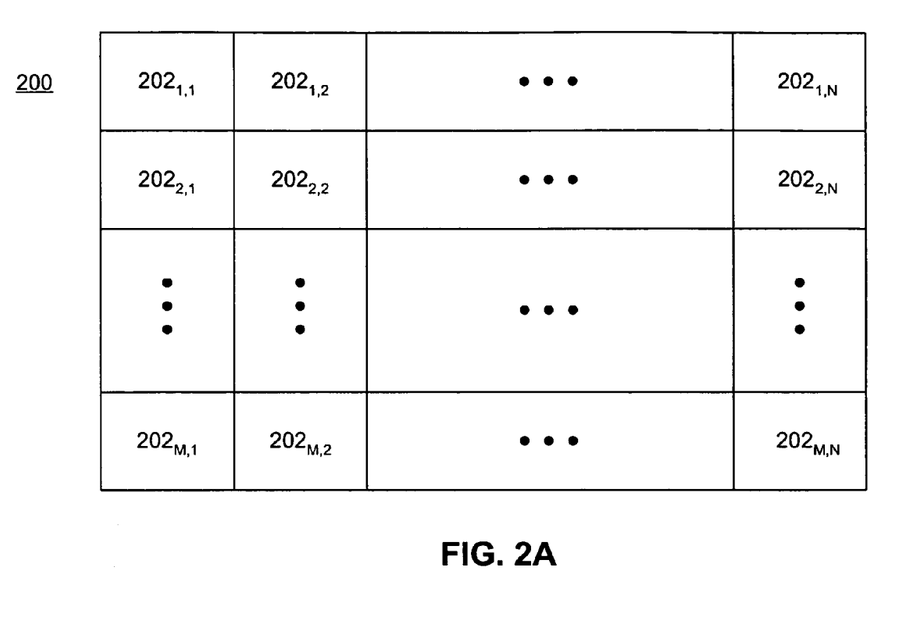
FIG. 2A illustrates a composite model representing a topography of a section of land.

In FIG. 2A, composite model 200 includes an array of blocks $202_{1,1}$ to $202_{M,N}$, each of which may have a coordinate associated with a particular area of the worksite (e.g., an associated x, y coordinate in a linear plane of the worksite), and may represent a predetermined and configurable area of the worksite. For example, each block 202 may represent 40 meters×40 meters of the worksite. Therefore, a particular location on the composite model 200 can be found quickly by first searching a block coordinate, and then identifying the particular cell matching the location.

Figure 2B:
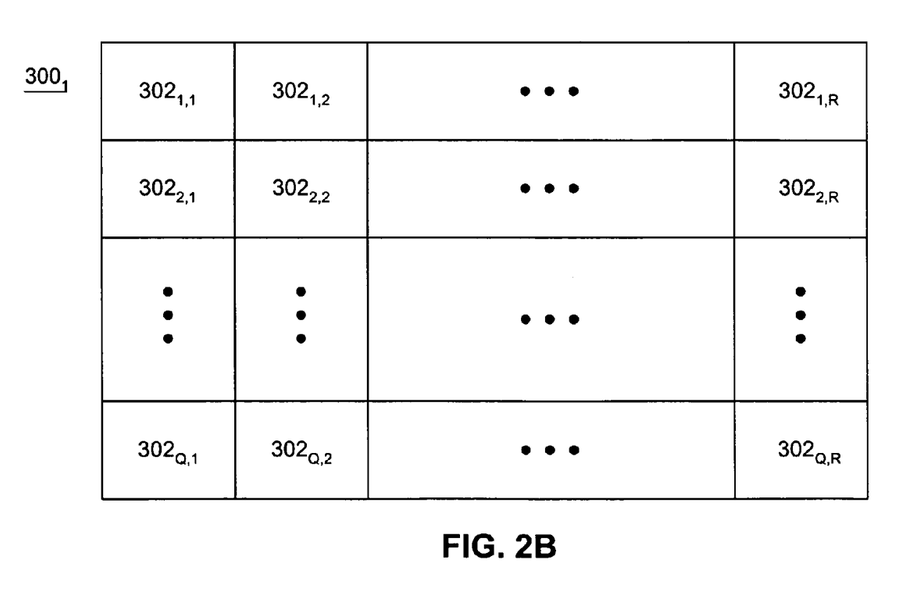
FIG. 2B illustrates of a layer associated with the composite model.

The data structure associated with each block 202 typically includes one or more layers 300, each of which corresponding to a particular terrain parameter (e.g., elevation, coverage, ore status information, or coverage information). Thus, layer $300_1$, as shown in FIG. 2B, may represent an elevation of the worksite and is associated with one of blocks 202 (e.g., block $202_{2,2}$). Other layers may represent other parameters as shown in FIG. 3A and discussed below.

Each layer includes a two (2) dimensional array of cells 302, each of which being associated with a portion of the worksite area corresponding to a respective one of blocks 202. Layer $300_1$, for example, may include cells $302_{1,1}$ through $302_{Q,R}$. One of these cells, for example cell $302_{1,1}$, may include a header equal to an absolute value, from which the values stored in other cells 302 (for example, cells $302_{1,2}$-$302_{Q,R}$) are offset. For example, layer $300_1$ may include elevation data and cells 302 associated with layer $300_1$ may include elevation values, in binary form, associated with corresponding locations of worksite 112. To obtain the elevation value in a particular cell, therefore, computer $106_1$ adds the offset value in a particular cell 302 to the absolute value stored in header cell $302_{1,1}$. Accordingly, database $105_1$ need not store actual elevation values, as well as actual values of other terrain-related parameters. Offset values are stored instead, which require substantially less memory capacity.

Figure 3A:
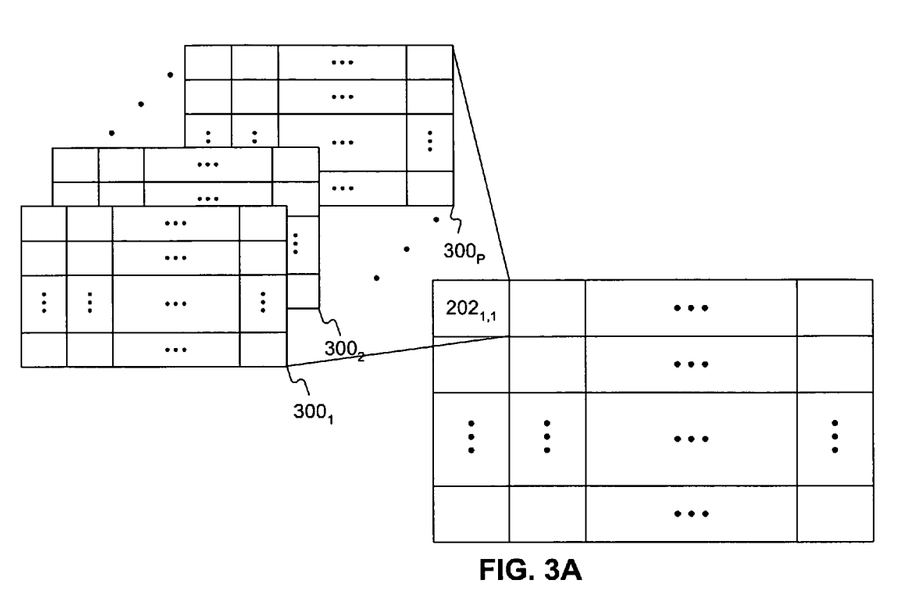
FIG. 3A illustrates blocks and layers consistent with an aspect of the present disclosure.

FIG. 3A shows a relationship between blocks $202_{1,1}$-$202_{M,N}$ and layers $300_1$-$300_P$. Block $202_1$ may include layers $300_1$-$300_P$, each of which corresponding to worksite-related parameters. Sparse grids, blocks, layers, and cells discussed above are also described in U.S. Pat. No. 5,935,192, the contents of which are fully incorporated herein by reference.

Returning to FIG. 1, received position data from the GPS satellite is used to determine worksite-related parameters (terrain data) and the terrain data is stored in on-board database $105_1$. The terrain data may be stored in the form of composite model 200 as explained above. In addition, alterations to the topography of the worksite attributable to machine 102, for example, are separately saved by that machine in the form of a snippet 350 (see FIG. 3B), which include one or more data packets of data in compressed form. Machine $102_1$, for example, may send multiple snippets of terrain data that it generates to one or more of machines $102_2$-$102_x$. Collectively, these snippets constitute a data block. Snippets are explained in further detail below.

Figure 3B:
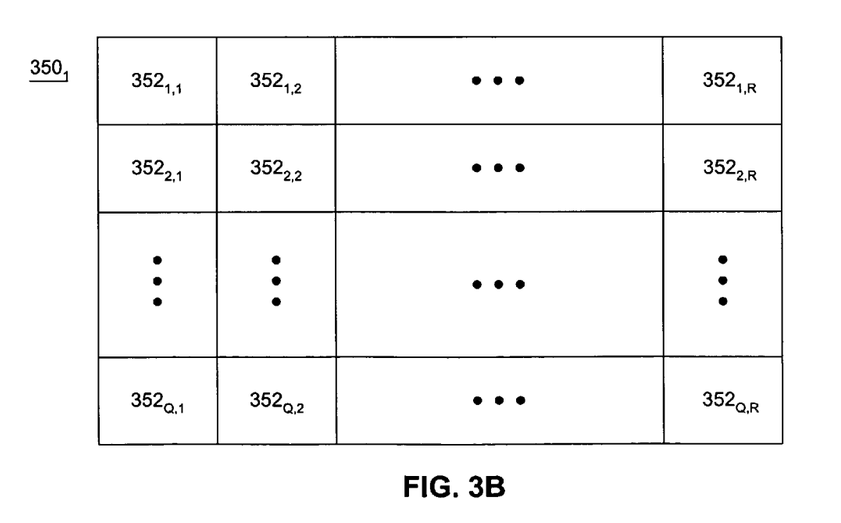
FIG. 3B illustrates a snippet consistent with an additional aspect of the present disclosure.

Snippets typically have a format similar to that of layer $300_1$ discussed above in regard to FIG. 2B. In particular, FIG. 3B shows a snippet $350_1$, which includes a worksite-related parameter associated with a particular layer 300 of one of blocks 202, which is to be updated with new terrain data. Snippet $350_1$ includes cells $352_{1,1}$-$352_{Q,R}$, which correspond to cells $302_{1,1}$ to 302 as of layer $300_{1,1}$, for example, snippet 350 typically includes new terrain data which has been generated within a predetermined period of time, e.g., every 10 seconds. The new terrain data is stored in those snippet cells corresponding to cells of layer 300 associated with a portion of the worksite which has been recently altered. Accordingly, assuming that cells of layer $300_1$ includes elevation information associated with portions of 40×40 square meter area of the worksite, if machine $102_1$ alters the elevation in one of these portions corresponding to cell $302_{2,2}$, for example, the data associated with that altered portion, i.e., the new data, will be stored in cells $302_{2,2}$, of layer $300_1$. In addition, the new data will be stored in a corresponding cell, e.g., cell $352_{2,2}$ of snippet 350.

Figure 3C:
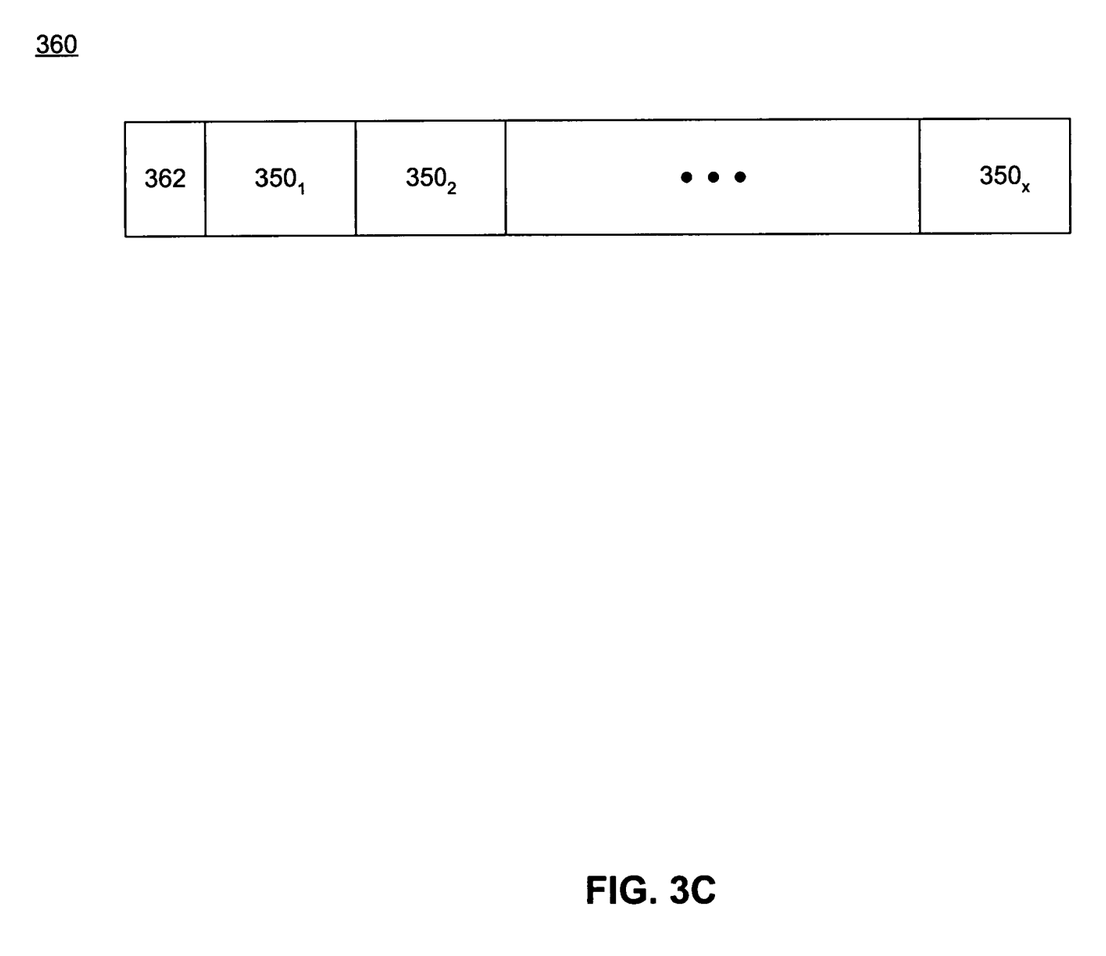
FIG. 3C illustrates a data block consistent with an additional aspect of the present disclosure.

Multiple snippets 350 can be collected into the data block over a predetermined period of time and transmitted to one or more machines 102 at worksite 112, as well as office 107. Upon receipt of the data blocks, the receiving machines 102 can update their respective composite models. An example of a data block 360 is shown in FIG. 3C. As noted above, data block 360 may contain multiple snippets, for example, snippets $350_1$-$350_x$, as well as a configuration key 362, which may designate formatting and sending information as will be discussed in greater detail below.

The timing of when the snippets 350 are sent by a particular machine may depend on a number of factors, including the size of a file containing the data block or the time interval between data block transmissions. If the data blocks are sent too frequently, the communications network that includes computer 110 in office 107 and, computers $106_1$-$106_x$ may be overly burdened, thereby slowing down processing of information at each of machines $102_1$-$102_x$.

If the data blocks are sent infrequently, however, changes may be made to the worksite between data block transmissions. As a result, the data blocks will not accurately reflect the updated terrain data. The maximum size of the data block and the time interval for sending the data block of collected snippets may be determined by configuration key 362. Each cell, associated with the data blocks, may have an associated time so that if a machine covers the same area covered by another machine the older information will not be used to incorrectly update the other machine.

Configuration key 362 has a data format including fields, which indicate which machines receive the snippet, as well as other formatting indicators. Configuration keys 362 may also determine which machines 102 receive and send particular data blocks 360, such as, by setting an address. For example, one or more machines 102 may belong to a multicast group that receives and transmits data block 360 to one another. Each machine in the multicast group may be related to one another, such as each may operate on the same area of worksite 112, and each of machines 102 within the group only receives the terrain information generated by other machines 102 in that group. Thus, as worksite 112 is geographically altered, each machine 102 belonging to the same group is updated with accurate terrain data output from machines 102 within that group.

Configuration key 362 may include a range of multicast addresses designating the multicast group. For example, each of the machines may be identified as addresses within a range of addresses on an IP radio network, such as 224.0.0.0 to 239.255.255.255. The multicast address for sending and receiving information may also include a group identification indicator, which corresponds to the multicast group.

When snippets 350 are broadcast generally, however, all of machines 102 within a predetermined distance receive the snippets 350. For example, machines $102_2$ through $102_x$ may be working in the same area of a worksite as machine $102_1$, and machine $102_1$ may broadcast a data block to machines $102_2$ through $102_x$ so that each of these machines receive information related to work performed by machine $102_1$.

In addition to carrying terrain data, snippet 350 may also include position information of a machine 102 sending that snippet. For example, position information of sending machine $102_1$ may be included in a snippet, which is sent to receiving machine $102_2$. The position information may then be extracted from the received snippet and used to update position of machine 102, shown on a display at machine $102_2$.

When the snippets are collected into data block 360, a bitmap 400 (see FIG. 4) is created for each snippet in the data block. The bitmaps are transmitted with the data block so that computer 106 in a receiving machine 102 can associate the updated terrain data within each snippet 350 with corresponding blocks 202 of composite model 200 and layers 300 in the receiving machine $102_1$.

Figure 4:
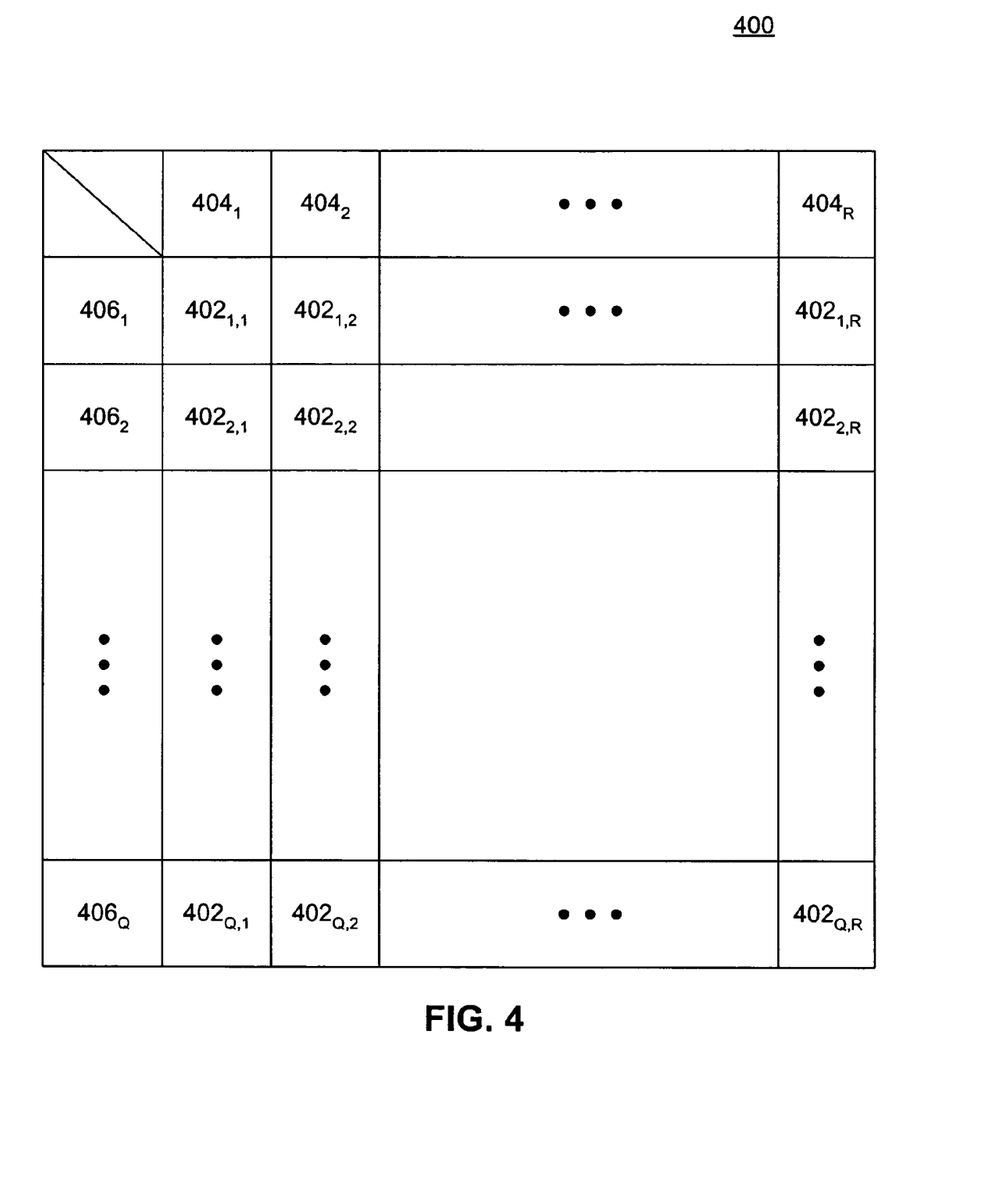
FIG. 4 illustrates a bitmap consistent with an exemplary embodiment of the present disclosure.

As shown in FIG. 4, bitmap 400 has cells $402_{1,1}$ to $402_{Q,R}$, collectively referred to as cells 402. Bitmap 400 corresponds to one snippet, e.g., snippet $350_1$ and cells $402_{1,1}$ to $402_{Q,R}$ correspond to $352_{1,1}$ to $352_{Q,R}$ of snippet 350 (see FIG. 3B). Other bitmaps may correspond to other snippets in data block 360. For example, there may be other bitmaps corresponding to snippets $350_2$-$350_x$. Certain cells 402 may have a binary "1," to indicate that corresponding cells 352 have new data. Other cells store a "0," or are left blank indicating that no new data is present in corresponding cells 352 of snippet 350. In addition, bitmap 400 may contain column bits $404_1$-$404_R$ and row bits $406_1$-$406_Q$ that may be used so that a receiving machine can more readily identify those bitmap cells that contain "1," and which do not.

For example, if a particular column of cells 402 in bitmap 400 includes a cell set to a "1," the column bit 404 associated with that cell is also set to "1." Likewise, if one of row bits 404 is "1," one of cells 402 in the row associated with that row bit will also be set to "1." Accordingly, the receiving machine can readily identify the bitmap cells having a "1," and thus the corresponding location of new data within snippet 350 by identifying those row and column bits with a "1". It is noted that if a row or column of bitmap 400 is set to "0," then the row or column associated with that bit does not include any cells set to "1." Accordingly, the corresponding snippet row or column can be assumed to not include new terrain data.

For example, a column bit equaling "1", indicates that at least one bitmap cell associated with the column has new data. Similarly, a row bit equaling "1," indicates that at least one bitmap cell associated with the row has new data. Thus, compression is achieved because only the cells 402 where column bits 404 and row bits 406 are equal to "1" are transmitted.

Figure 5:
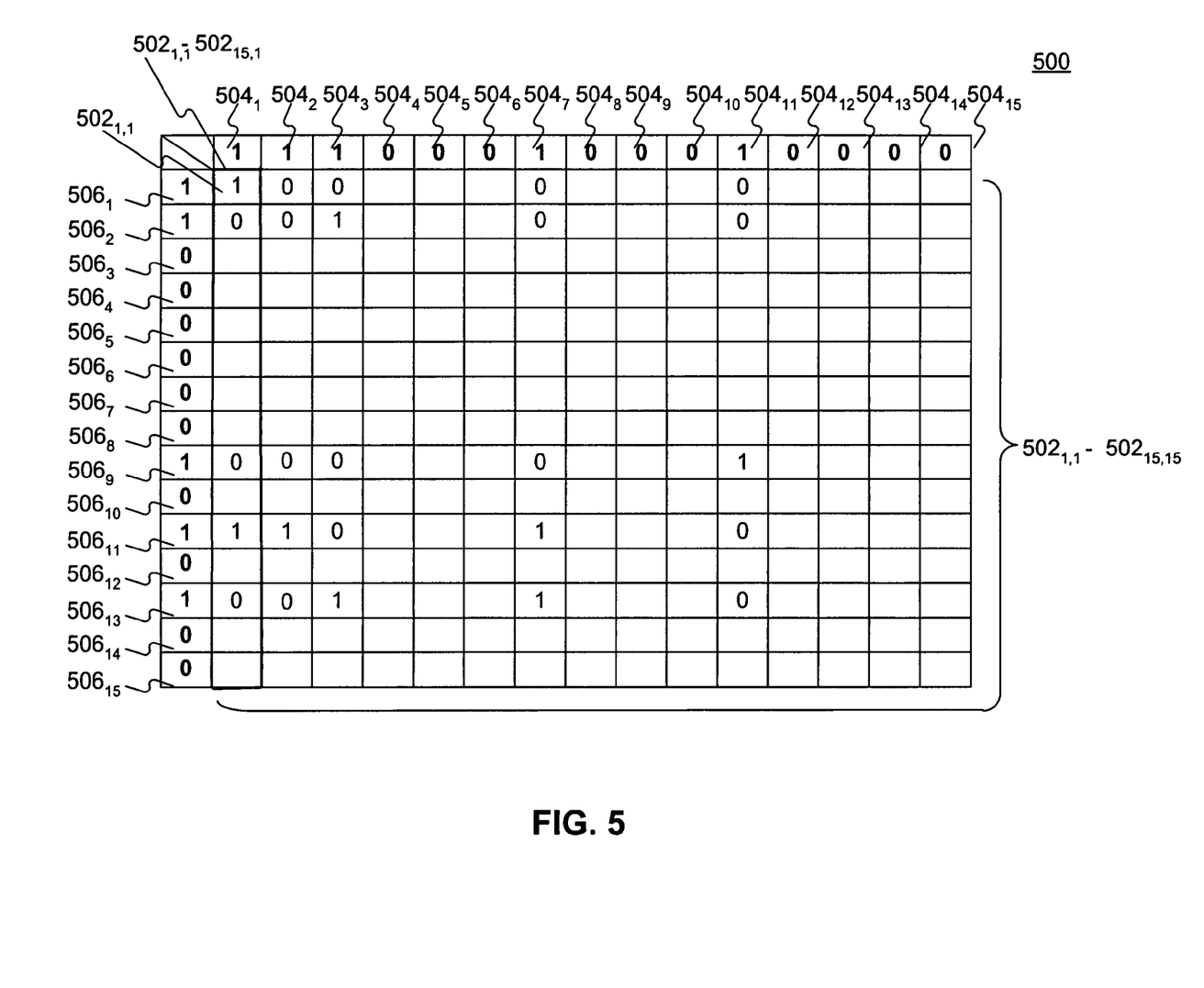
FIG. 5 illustrates a bitmap consistent with a further aspect of the present disclosure.

FIG. 5 illustrates a bitmap 500 showing bitmap 400 in greater detail. In this example, bitmap 500 comprises a 15×15 array of cells $502_{1,1}$ through $502_{15,15}$, a row of column bits $504_1$-$504_{15}$, and a column of row bits $506_1$-$506_{15}$. In this example, cells 502, column bits 504, and row bits 506 of bitmap 500 constitute a 16×16 matrix.

Cells 502 having a binary "1" correspond to snippet cells containing new information. As noted above, an example of a snippet is shown as snippet $350_1$ in FIG. 3B. For example, cell $502_{1,1}$ equaling a binary "1" may indicate that cell $352_{1,1}$ of snippet 350, in a transmitted data block has new information.

Column bits $504_1$-$504_{15}$ indicate whether there are any cells 502 within a particular column that have new information. For example, column bit $504_1$ is associated with a column of cells 502 including cells $502_{1,1}, 502_{2,1}, 502_{3,1}, 502_{4,1}, 502_{5,1}, 502_{6,1}, 502_{7,1}, 502_{8,1}, 502_{9,1}, 502_{10,1}, 502_{11,1}, 502_{12,1}, 502_{13,1}, 502_{14,1}$, and $502_{15,1}$ Column bit $504_1$ is equal to binary "1," because there is at least one cell 502 (e.g., either cell $502_{1,1}$ or $502_{11,1}$) within the first column that has new data. If a particular column bit 504 is equal to a binary "0," then there is no new data in any one of cells 502 associated with that particular column, as noted above. For example, cells $502_{1,4}$ to $502_{15,4}$ are all blocks and have a corresponding column bit $504_4$ of "0".

Similarly, row bits $506_1$-$506_{15}$ indicate whether there are any cells 502 within a particular row that has new information. For example, row bit $506_1$ is equal to binary "1," because there is at least one cell 502 (e.g., cell $502_{1,1}$) equal to a binary "1," within the first row. If a particular row bit 506 is equal to a binary "0," then there is no new data associated with that particular row.

Thus, as will be shown below, cells 502 having an associated column bit 504 and row bit 506 are equal to binary "0," are blank and do not need to be sent with bitmap 500, thereby further decreasing the amount of data sent between machines 102 and compressing a size of bitmap 500.

In addition, column bits 504 and row bits 506 allow a receiving machine to determine where new information is sent, so that the receiving machine does not need to read each cell in the snippet.

In conjunction with the bitmap (e.g., bitmap 400 or 500), a flag is sent to indicate one of four levels of population of the new information in snippet $350_1$. The flag may be represented as a two bit byte and may be equal to 00, 01, 10, or 11. The levels of population depend upon how much new data is present in snippet $350_1$, as will be explained in further detail below.

In the example of FIG. 5, the flag is 01, which indicates that bitmap 500 contains information to determine the locations of new data in the snippet associated with the bitmap.

Figure 6:
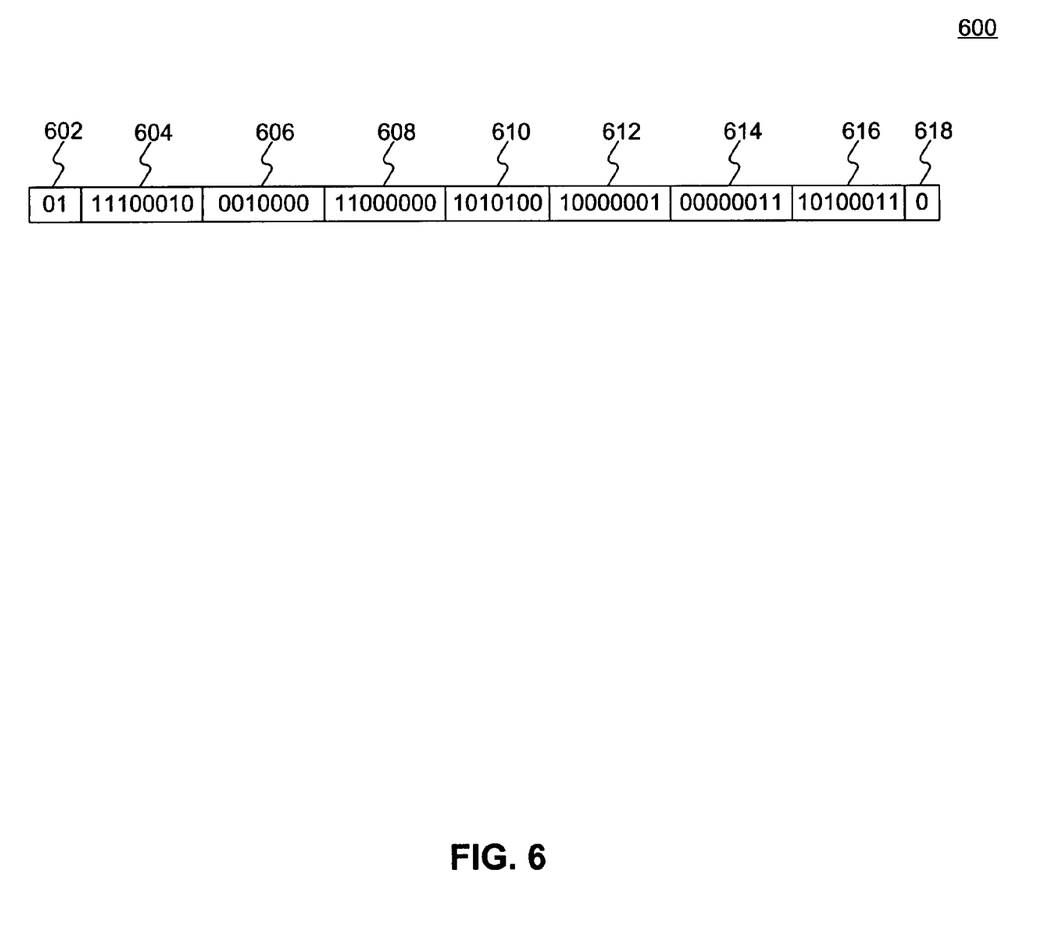
FIG. 6 illustrates a serial data stream consistent with another aspect of the present disclosure.

As shown in FIG. 6, bitmap 500 may be sent to machines 102 as a serial data stream 600 represented as: 01 111000100010000 110000001010100 1000000100000011101000110; wherein a first byte 602 represents the flag (01), a second byte 604 and a third byte 606 represent column bits $504_1$-$504_{15}$ (111000100010000), a fourth byte 608 and fifth byte 610 represent row bits $506_1$-$506_{15}$ (110000001010100), and a sixth byte 612, a seventh byte 614, an eighth byte 616, and a ninth byte 618 represent cells 502 that are not blank, i.e., cells 502 that contain neither a "0" or a "1" (1000000100000011101000110). A machine 102 receiving serial data stream 600 reconstructs bitmap 500 to determine the locations of the new data in the associated snippet as discussed above. In addition, if the receiving machine 102 determines that the new information has already been received, by using, for example, a time stamp associated with the snippet, the received information may be discarded since the new information is already reflected in the composite model of the receiving machine 102.

As noted above, there may be other values for the flag. For example, a flag equal to 00 may represent that there is no new data to update the composite model. In this case, every column bit 404 and row bit 406 would be equal to "0" and no updating is required because no new information exists. Therefore, no bitmap is sent.

A flag equal to "11" may represent that the bitmap is full, and every cell of the bitmap is equal to a binary "1," indicating that there is new data in every corresponding cell of the associated snippet. Thus, in this state, each cell of the associated snippet will be used to update a machine 102 receiving the data block, thereby eliminating the need for the bitmap. Since all the information is new, the entire bitmap need not be transmitted, which would otherwise increase the amount of data being sent instead. In that case, the bitmap may be specified in 1 byte for the flag and based on this byte the receiving machine updates all of its existing information with the information of all the cells of the associated snippet.

A flag equaling "10" may indicate a state where each column bit and row bit are equal to "1," however, every cell of the bitmap may not equal "1." Thus, in this state, the bitmap is sent in its entirety (as opposed to when flag 602 equals 11), because the receiving machine may need to use the bitmap to determine where new data is located. A flag equaling "10" may represent the largest size of a sent serial data stream, because no column bit or row bit is equal to "0," which would otherwise further minimize the serial data stream. Conversely, in the state in which the flag is equal to "01," the bitmap may be minimized to not include those cells in rows and columns having associated row and column bits of "0."

INDUSTRIAL APPLICABILITY

Returning to FIG. 1, one of machines $102_1$-$102_x$ (e.g., machine $102_1$) may gather data from a satellite positioning system, such as a GPS. Using the data received from the satellite positioning system, a composite model associated with machine $102_1$ may be updated to reflect changes to the worksite performed by machine $102_1$. Using the specific terrain data computed after processing the raw GPS positions, machine $102_1$ may also collect snippets for a predetermined amount of time or to a predetermined file size. The snippets may correspond to the particular terrain data. The snippets may also be grouped into a data block and transmitted to other machines (e.g., machines $102_2$-$102_x$) along with one or more bitmaps, which indicate locations within the received data block of new terrain information. Also, machine $102_1$ may receive data blocks and bitmaps from one or more of machines $102_2$-$102_x$. Further an office computer may also update its site database using the transmitted snippet information.

The present disclosure uses several features to reduce the amount of data that is transmitted to and from each of machines 102 in order to create a composite model viewable by operators of one of machines $102_1$-$102_x$ to accurately reflect work performed on worksite 112. For example, updated terrain data is transmitted between machines but typically no data is sent if no changes to the worksite are made. Moreover, the present invention also does not require the re-calculation of terrain data by each machine, thereby reducing the processing time and effort required to update the composite model at each machine. The present invention may use a sparse grid having absolute and offset values, a snippet in a format of the sparse grid, a data block comprising one or more snippets, and a bitmap indicating locations of new data within the data block, wherein the bitmap may be further compressed to indicate only those locations where new data is present in the data block, as explained above.

Also, because the data being transmitted to and from each one of machines $102_1$-$102_x$ is not the raw GPS positions, the present disclosure provides a system in which each one of machines $102_1$-$102_x$ does not need to store the particular characteristics of each machine on the worksite (as explained above) in order to update its composite model. The information that is transmitted between each of machines $102_1$-$102_x$ represents the new terrain data, that is, the information after processing the raw GPS positions to determine the resulting topography of the worksite. The new terrain data can be sent to other machines and because the information does not need further processing as raw GPS positions would otherwise require, the new terrain data can be readily stored or merged into the databases of the receiving machines using known software programming techniques. Thus, communications may be conducted more quickly and efficiently.

In a further embodiment of the present invention, terrain data may be transferred to a machine 102 (e.g., machine $102_1$) that may enter an area where other machines 102 may be operating and where previously machine $102_1$ was out of reach of the respective communication systems 106 of the other machines 102. Although machine $102_1$ did not receive previous terrain data from the other machines 102 to update database $105_1$, upon entering the area, machine $102_1$ may send a request to the office computer or to the other machines in the area to transmit terrain data necessary for machine $102_1$ to update its composite model. Machine $102_1$ may thus be updated with all the terrain data that machine $102_1$ requires so that the most current topology of the worksite is displayed to the operator. The manner in which the terrain data is transferred and stored is consistent with the methods and systems previously described.

Figure 7:
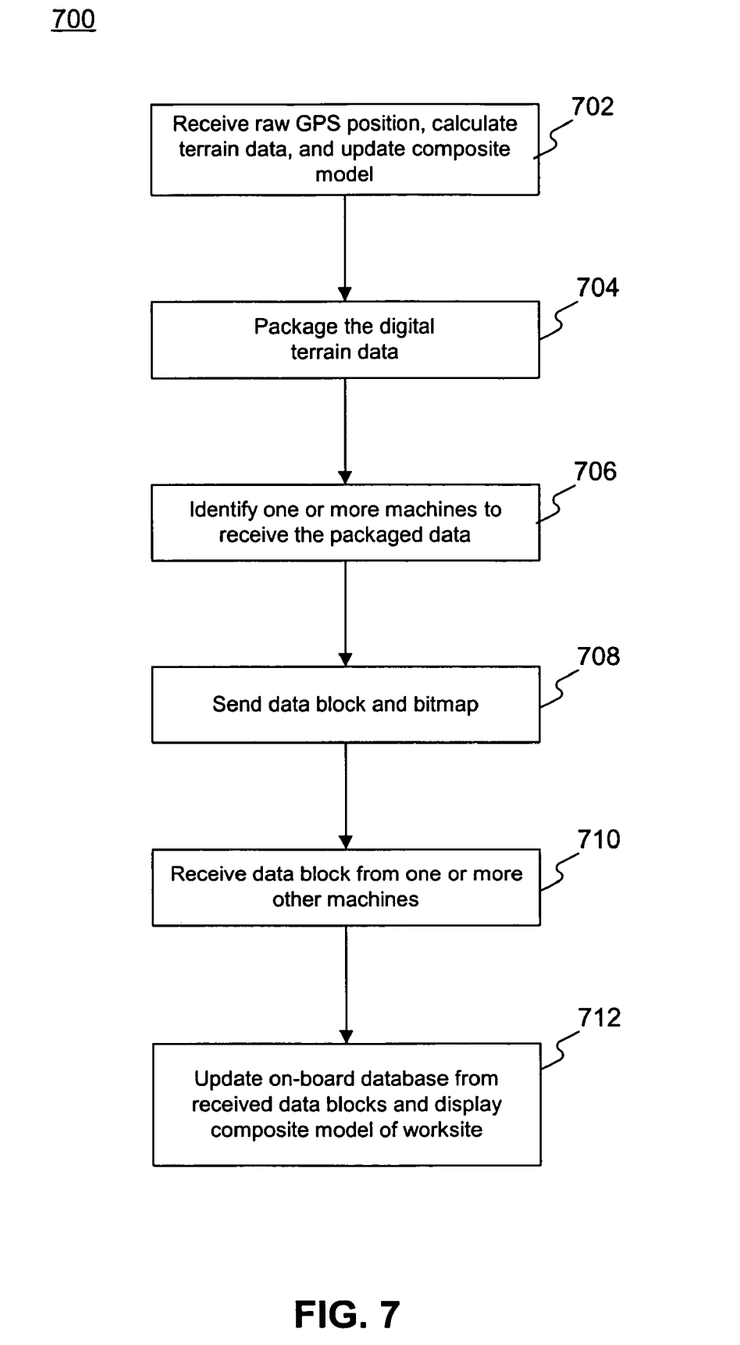
FIG. 7 is a flowchart illustrating a method consistent with a further object of the present disclosure.

FIG. 7 illustrates a flowchart for a method 700 for sharing information between machines working on a worksite that shows the operation of the present disclosure in greater detail. The method may be carried out by using computers resident in one or more geography-altering machines 102.

Method 700 begins at stage 702, in which a first machine receives position data from a satellite positioning system such as raw GPS positions from one or more GPS satellites. Terrain data is determined using the raw GPS positions. The acquisition of the raw GPS positions may be performed by the communication system on-board a first earthmoving machine (for example, machine $102_1$) by using known three-dimensional (3D) positioning technology. For example, referring to FIG. 1, machine $102_1$ may receive position raw GPS positions from a GPS satellite using communications system $106_1$. The raw GPS positions are used to calculate specific terrain data and the terrain data may be used to update a composite model at machine $102_1$ and sent to other machines as discussed in greater detail below.

At stage 704, the terrain data is packaged for wireless transfer to one or more other geography-altering machines. The terrain data may be packaged as a collection of snippets (a data block). As explained above, a snippet includes new information associated with a particular machine as the machine operates on a worksite.

At stage 706, machines are identified that may receive the data block. For example, the data block is broadcast or multicast to specific machines as explained with regard to FIG. 1. In particular, machines $102_1$ through $102_x$ may form a broadcast group that are configured to receive terrain information about each other, as well as send terrain information to each other according to an IP group, as further discussed above. In addition, a multicast group may be a subset of machines, such as machines $102_2$-$102_3$.

At stage 708, the data block associated with a particular machine is sent to the one or more machines identified in stage 706. For example, the data block may be sent by machine $102_1$ to one or more machines 102. The data block may be sent with one or more bitmaps respectively corresponding to one or more snippets in the data block as explained above with regard to FIGS. 4-6.

At stage 710, data blocks of other machines are received by the first geography-altering machine. For example, in addition to sending information to machines $102_2$ through $102_x$, machine $102_1$ may receive data blocks from one or more of these other machines 102.

At stage 712, data blocks received at stage 710 may be used to update an on-board database of the first machine. The database may be accessed by an on-board computer, which may include a monitor for use by an operator of the machine. The on-board computer may use the data in the database, including the newly received data block, to display a composite model of the worksite on the monitor. Thus, as an operator of a machine performs work on the worksite, the operator may view the composite model of the worksite on the display. As data blocks are received, the database may be updated and the on-board computer may update the composite model. The updated composite model may thus be displayed in a near real time manner.

The display may show sections of the worksite in different colors, wherein the colors indicate whether the associated section has been completed in accordance with predetermined plan or has not been completed. For example, the color red may show that the section has not been completed and the color green may indicate the section has been completed. If the operator sees that a particular section is red, the operator may continue working on that section (e.g., excavating, digging, covering, etc. depending on the predetermined plan) until the display shows that section to be the color green.

As noted above, the disclosed system may advantageously send new terrain data between machines, as opposed to sending raw GPS positions from a sending machine that would require further processing by each receiving machine to determine the terrain data associated with the sending machine. Therefore, the amount of data transferred between geography-altering machines may be decreased allowing for near real-time updating of the composite model for each machine. Moreover, the present invention also does not require the re-calculation of terrain data by each machine, thereby reducing the processing time and effort required to update a composite model at each machine.

Other embodiments of the disclosure will be apparent to those skilled in the art from consideration of the specification and practice of the disclosure. It is intended that the specification and examples be considered as exemplary only, with a true scope and spirit of the disclosure being indicated by the following claims.

What is claimed is:

1. A method for sharing terrain data on a worksite, the method comprising:
   generating a plurality of packets of terrain data representing work performed on the worksite;
   transmitting the plurality of packets of terrain data from a first machine to a second machine; and
   updating a composite model of the worksite with the packets of terrain data.

2. A method for sharing terrain data on a worksite, the method comprising:
   generating a plurality of packets of terrain data representing work performed on the worksite; and
   transmitting the plurality of packets of terrain data from one or more machines to an office computer; and
   updating a composite model of the worksite with the packets of terrain data.

3. The method of claim 2, wherein the one or more machines send a request for information and receive one or more packets of terrain data from a site database running on an office computer.

4. The method of claim 2, further including:
   transmitting the plurality of terrain data to a remote location.

5. The method of claim 1, wherein generating includes calculating the terrain data based on raw GPS positions.

6. The method of claim 1, further including
   creating a data block comprising the plurality of packets of terrain data; and
   creating a plurality of bitmaps, each corresponding to a respective one of the plurality of packets of terrain data, each of the plurality of bitmaps representing locations in the data block having information for updating the composite model of the worksite.

7. The method of claim 6, wherein each packet of terrain data is associated with a parameter indicating at least one of elevation data associated with the worksite, compaction data, coverage data, and ore status information associated with the worksite.

8. The method of claim 6, wherein each packet of terrain data is associated with a parameter indicating at least one of elevation data associated with the worksite, compaction data, coverage data, and ore status information associated with the worksite, wherein each cell, associated with each packet of terrain data, has an indication of time, and wherein the indication of time is used to determine which cells associated with the second machine should be updated.

9. The method of claim 7, wherein each data block has one or more keys for setting a maximum size of the data block.

10. The method of claim 7, wherein each data block has one or more keys for setting a time for sending the data block.

11. The method of claim 6, further including receiving at the first machine data blocks and bitmaps, associated with the data blocks, from the second machine.

12. The method of claim 11, further including: updating a composite model of the worksite on the first machine using the bitmaps received from the second machine to locate information in the data blocks received from the second machine.

13. The method of claim 12, further including: displaying the composite model of the worksite to an operator of the first machine updated from each received data block of the second machine.

14. The method of claim 12, wherein the first machine sends a request to the second machine and receives one or more packets of terrain data from the second machine after entering an area where the second machine is operating on the worksite.

15. The method of claim 6, further including: transmitting a flag, for each bitmap, indicating an amount of new data located in the corresponding packet of terrain data.

16. The method of claim 15, further including: receiving information from a satellite positioning system to determine alterations to the worksite attributable to the first machine.

17. The method of claim 15, further including: determining productivity information attributable to the first machine by using information received from the satellite positioning system.

18. The method of claim 11, further including: determining productivity information attributable to the second machine using received data blocks from the second machine.

19. The method of claim 6, wherein the packets of terrain data have a format consistent with a sparse grid.

20. The method of claim 19, wherein the packets of terrain data contain a first cell indicating an absolute value for a parameter and plurality of second cells representing offsets from the absolute value.

21. The method of claim 6, further including: updating a composite model of the worksite for the second machine with the data block and plurality of bitmaps from the first machine.

22. The method of claim 21, further including: displaying the composite model of the worksite to an operator of the second machine updated from each received data block of the first machine.

23. A system for sharing terrain data on a worksite, comprising:
   a communications system associated with a first machine, the communications system being configured to send a plurality of first packets of terrain data representing work performed on the worksite associated with the first machine, the communications system being configured to receive a plurality of second packets of terrain data representing work performed on the worksite associated with a second machine; and a database associated with the first machine and configured to store the plurality of first packets of terrain data and the plurality of second packets of terrain data, wherein at least one of the plurality of first and second packets of terrain data is configured to update a composite model of the worksite.

24. The system of claim 23, wherein the communications system associated with a first machine is configured to send a first data block, the first data block including the plurality of first packets of terrain data, and a plurality of bitmaps each of which being associated with a corresponding one of the plurality first packets of terrain data, and the communications system is configured to receive a second data block, the second data block including the plurality of second packets of terrain data, and a plurality of bitmaps each of which being associated with a corresponding one of the plurality of second packets of terrain data; and wherein each of the plurality of bitmaps identify new information contained in the second data block to update the database.

25. The system of claim 24, wherein the communication system is further configured to receive information from a satellite positioning system.

26. The system of claim 25, wherein each of the first data block and second data block is associated with a parameter corresponding to at least one of elevation data associated with the worksite, compaction data, coverage data, and ore status information associated with the worksite.

27. The system of claim 26, wherein each of the first data block and second data block has one or more keys for selling a maximum size.

28. The system of claim 26, wherein each of the first packets of terrain data and second packet of terrain data has one or more keys for selling a sending time.

29. The system of claim 24, further including:
an on-board computer, associated with the first machine, configured to access the on-board database and generate the composite model of the worksite using information stored in the on-board database.

30. The system of claim 29, wherein the on-board computer includes a display monitor to display the composite model to an operator of the first machine.

31. The system of claim 29, further including:
an on-board database, associated with the second machine, configured to store the first data block and second data block; and
an on-board computer, associated with the second machine, configured to access the on-board database associated with the second machine and generate the composite model of the worksite using information stored in the on-board database associated with the second machine, wherein the on-board computer associated with the second machine includes a display monitor to display the composite model to an operator of the second machine.

32. The system of claim 24, wherein the communications system receives information from a satellite positioning system to determine alterations to the worksite attributable to the first machine.

33. The system of claim 32, wherein the on-board computer determines productivity information attributable to the first machine using the information received from the satellite position system.

34. The system of claim 33, wherein the on-board computer determines productivity information attributable to the second machine.

35. The system of claim 24, wherein the communications system is further configured to transmit a flag, for each of the plurality bitmaps associated with each first packet of terrain data, indicating an amount of new data located in the corresponding first packet of terrain data.

36. The system of claim 24, wherein the first machine sends a request to the second machine and receives the second data block and the plurality of bitmaps associated with the second data block after entering an area where the second machine is operating on the worksite.

* * * * *